United States Patent
Broker

(10) Patent No.: US 10,156,863 B2
(45) Date of Patent: Dec. 18, 2018

(54) SYSTEMS AND METHODS FOR CONTROLLING APPLIANCES

(71) Applicant: Emerson Electric Co., St. Louis, MO (US)

(72) Inventor: John Broker, Warrenton, MO (US)

(73) Assignee: Emerson Electric Co., St. Louis, MO (US)

( * ) Notice: Subject to any disclaimer, the term of this patent is extended or adjusted under 35 U.S.C. 154(b) by 287 days.

(21) Appl. No.: 15/173,194

(22) Filed: Jun. 3, 2016

(65) Prior Publication Data

US 2017/0351287 A1 Dec. 7, 2017

(51) Int. Cl.
  *G05F 1/66* (2006.01)
  *G05B 15/02* (2006.01)

(52) U.S. Cl.
  CPC .............. *G05F 1/66* (2013.01); *G05B 15/02* (2013.01); *G05B 2219/2642* (2013.01)

(58) Field of Classification Search
  CPC .............. G05F 1/66; H02J 3/00; G05B 15/02
  USPC ........................................ 324/500, 509, 512
  See application file for complete search history.

(56) References Cited

U.S. PATENT DOCUMENTS

| 5,544,064 A | 8/1996 | Beckwith |
| 6,617,972 B2 * | 9/2003 | Takarada ........... G08B 21/0484 324/538 |
| 7,538,297 B2 | 5/2009 | Anderson et al. |
| 8,779,729 B2 * | 7/2014 | Shiraishi ............ G01R 31/3606 320/155 |
| 9,568,201 B2 * | 2/2017 | Fadell ................ G05D 23/1905 |
| 9,648,706 B2 * | 5/2017 | Millar ................ H05B 33/0842 |
| 9,687,748 B2 * | 6/2017 | Zahornacky ........... A63H 19/24 |
| 2012/0098518 A1 * | 4/2012 | Unagami ............. G01R 22/066 324/74 |

* cited by examiner

*Primary Examiner* — Giovanni Astacio-Oquendo
(74) *Attorney, Agent, or Firm* — Armstrong Teasdale LLP

(57) ABSTRACT

A control system for controlling operation of an appliance includes a first signal source configured to produce an alternating current (AC) signal, a second signal source configured to produce a second signal, and a controller. The controller includes a processor, a memory device, a first input pin coupled to the first signal source to receive the AC signal, a second input pin coupled to the second signal source to receive the second signal, and an analog to digital (A/D) converter. The A/D converter is coupled to the first input pin and the memory device storing instructions that when executed by the processor cause the processor to sample the second signal at the second input pin only when the first signal has a value of about zero volts at the first input pin.

29 Claims, 4 Drawing Sheets

SYSTEMS AND METHODS FOR CONTROLLING APPLIANCES

FIELD

The field of the disclosure relates generally to controlling appliances, and more particularly, to systems and methods for sampling input pins of a controller to limit noise on the signals on the sampled input pins.

BACKGROUND

In general, voltage readings on input pins of controller may experience noise produced by an alternating current (AC) voltage signal on another input pin of the controller. An AC signal coupled to an analog to digital (A/D) input pin of the controller may generate noise on the signals coupled to other A/D input pins of the controller. In some systems, the noise on other input pins may be particularly noticeable when the magnitude of the AC voltage signal on the A/D input pin is much larger than the positive supply voltage (VDD) for the controller the voltage readings for the other pins become skewed. As a result of the generated noise, the signal on the other pins sampled by the controller may be inaccurate, potentially causing the controller to execute the wrong instruction as a function of the erroneous input. For example, the instruction may be related to voltage magnitude, and the reported voltage is compared to values in a look-up table corresponding to a particular instruction.

Some known systems add filters and/or other additional hardware to a control circuit to attempt to limit the noise problem produced by a AC signal on an A/D input pin. Such additions add to the cost of the control circuit.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

According to one aspect of this disclosure, a control system for controlling operation of an appliance includes a first signal source configured to produce an alternating current (AC) signal, a second signal source configured to produce a second signal, and a controller. The controller includes a processor, a memory device, a first input pin coupled to the first signal source to receive the AC signal, a second input pin coupled to the second signal source to receive the second signal, and an analog to digital (A/D) converter. The A/D converter is coupled to the first input pin and the memory device storing instructions that when executed by the processor cause the processor to sample the second signal at the second input pin only when the first signal has a value of about zero volts at the first input pin.

Another aspect of this disclosure is a method of controlling operation of an appliance with a controller. The controller includes a processor, a first input pin coupled to an analog to digital (A/D) converter, and a second input pin. The method includes receiving, at the first input pin of the controller, an alternating current (AC) signal from a first signal source, receiving, at the second input pin of the controller, a second signal from a second signal source, determining, by the processor, when the first signal has a value of about zero volts at the first input pin, and sampling, by the processor, the second signal at the second input pin only when the first signal has a value of about zero volts at the first input pin.

Still another aspect of this disclosure is a control system for controlling operation of an appliance includes a first signal source configured to produce an alternating current (AC) signal, a second signal source configured to produce a second signal, and a controller. The controller includes a processor, a memory device, a first input pin coupled to the first signal source to receive the AC signal, a second input pin coupled to the second signal source to receive the second signal, and a clamp circuit coupled to the first input pin to receive the AC signal and output a square wave to the processor. The memory device stores instructions that when executed by the processor cause the processor to sample the second signal at the second input pin only when the first signal has a value of about zero volts at the first input pin.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

The embodiments described herein generally relate to controlling appliances, and more particularly, to systems and methods for sampling input pins of a controller to limit noise on the signals on the sampled input pins.

As used herein, the term "signal" refers to an analog or digital signal. In some embodiments, a signal may include one or more additional signals, e.g., as a plurality of signals superimposed on each other. For example, a signal obtained by measuring an electronic circuit may include a voltage signal, a current signal, and/or a noise signal.

Figure 1:
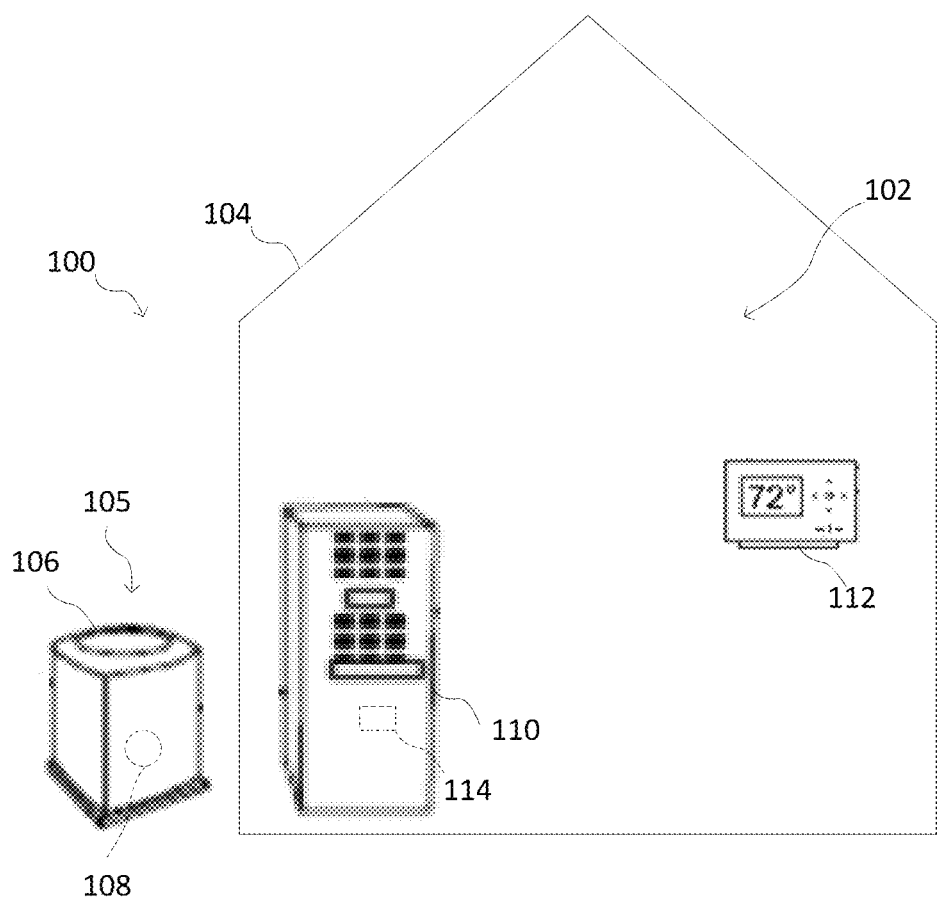
FIG. 1 is an illustration of an example appliance control system.

An example of an appliance control system of this disclosure is indicated generally in FIG. 1 by reference number 100. In this example, the appliance control system 100 is a heating ventilation and air conditioning (HVAC) system that utilizes the standard 24 volts of alternating current (24VAC) for the control system to control the climate of the interior 102 of enclosure 104. In other embodiments, 120VAC, 240VAC, or any other suitable voltage may be used. An air conditioner 105 includes a condenser unit 106 having a compressor 108. The system 100 also includes a gas-fired furnace 110. Appliance control system embodiments also are possible that include, e.g., a heat pump, a humidifier, a dehumidifier, an auxiliary heating system having a gas-fired furnace, and the like.

A thermostat 112 is capable of sensing temperature and responsively initiating operation of the air conditioner 105 or furnace 110 when the sensed temperature is more than a predetermined amount above or below a set point temperature of the thermostat 112. When the thermostat 112 signals a request for heating, a controller 114 controls the activation of the furnace 110 to provide for heating operation.

Figure 2:
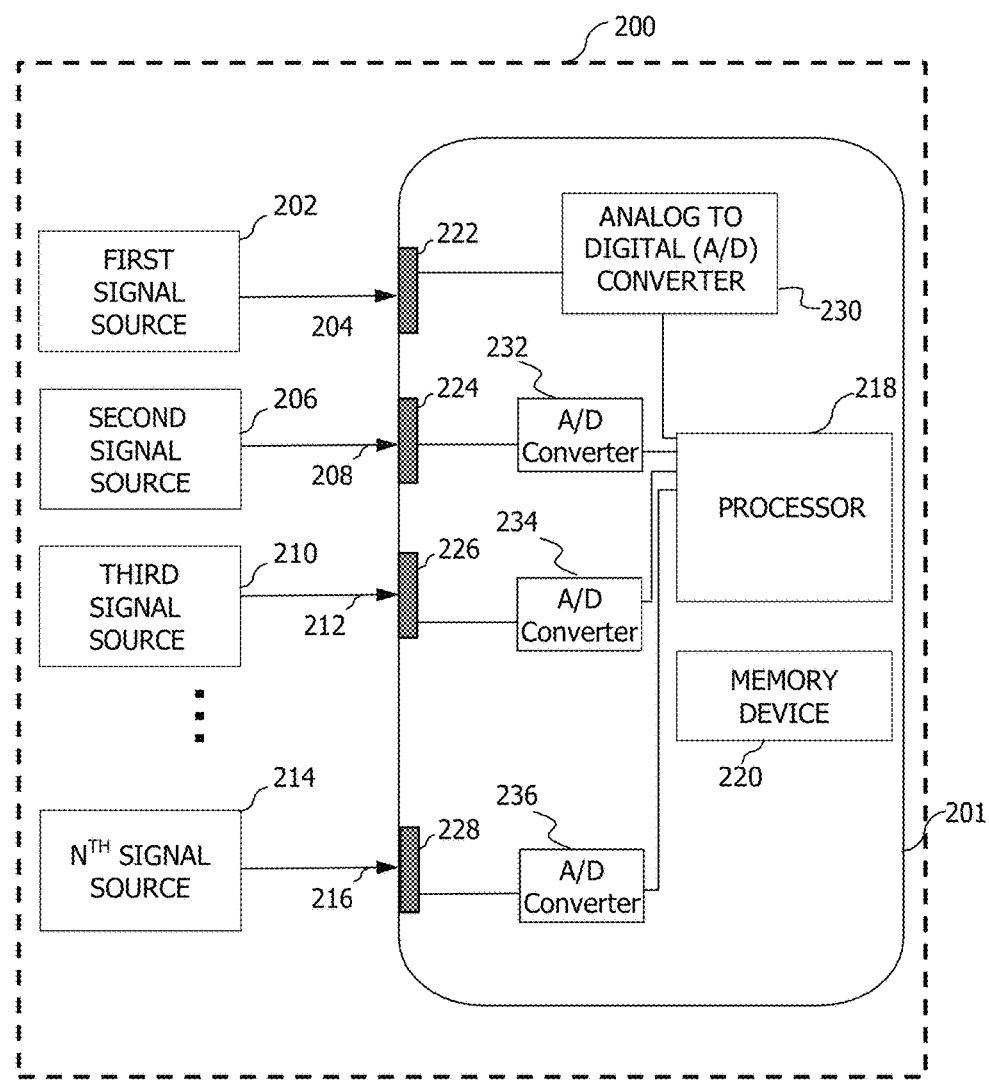
FIG. 2 is a block diagram of a portion of a control system for use in the appliance control system shown in FIG. 1.

FIG. 2 is a block diagram of a portion of a control system 200 for use in the appliance control system 100 shown in FIG. 1. The control system 200 may be part of the controller 114, the thermostat 112, or any other controller used in appliance control system 100. The control system 200 includes a controller 201. In the example embodiment, the controller 201 is a microcontroller. In some embodiments, the controller is a PIC18F45K20-I/P microcontroller, available from Microchip Technology Inc. of Chandler, Ariz., USA.

The control system 200 includes a first signal source 202 configured to produce an alternating current (AC) signal 204. A second signal source 206 is configured to produce a second signal 208. In some embodiments, the control system 200 may also include a third signal source 210 configured to produce a third signal 212. In other embodiments, any suitable number of signal sources (e.g. N signal sources) may be included as shown by Nth signal source 214. Nth signal source 214 is configured to produce Nth signal 216. Signal sources 202, 206, 210, 214 may include sensors, probes, detectors, switches, dip switches, or any other suitable signal source. Analog inputs can be used to sense temperature, humidity, input voltage, current, pressure, power, proximity, infra-red, carbon monoxide, oxygen, radiation, water/moisture, etc. The signals 204, 208, 212, 216 may be any suitable type of signal. The first signal source 202 is configured to produce AC signal 204 with a voltage of about twenty-four volts. Other embodiments are also contemplated in which the first signal source 202 is configured to produce AC signal 204 with a different voltage. In some embodiments, the controller 201 is configured to be powered by a voltage at a first magnitude and the first signal source 202 is configured to produce the AC signal 204 with a voltage at a second magnitude greater than the first magnitude. In some embodiments the second magnitude is at least twice the first magnitude.

Controller 201 includes a processor 218, a memory device 220, and input pins 222, 224, 226, and 228. The first input pin 222 is an analog input pin with a first A/D converter 230 and the second input pin 224 is an analog input pin with a second A/D converter 232. In some embodiments, the third input pin 226 and up to the Nth input pin 228 are analog input pins with a third A/D converter 234 up to an Nth A/D converter 236. In some embodiments, there are one or more digital input pins coupled without an A/D converter. In the example shown in FIG. 2, a first input pin 222 is coupled to the first signal source 202 to receive the AC signal 204, and a second input pin 224 is coupled to the second signal source 206 to receive the second signal 208. In some embodiments a third input pin 226 is coupled to the third signal source 210 to receive the third signal 212, and so on as needed up to Nth input pin 228 which is coupled to Nth signal source 214 to receive Nth signal 216. The AC signal 204 on the first input pin 222 will typically produce noise on samples of the signals 208, 212, 216 at the input pins 224, 226, 228.

To limit the noise when the signals on pins 224, 226, 228 are sampled, the memory device 220 stores instructions that when executed by the processor 218 cause the processor 218 to sample the second signal 208 at the second input pin 224 only when the first signal 204 has a value of about zero volts at the first input pin 222 (i.e., at a zero crossing). When the first signal 204 is at zero volts, it is functionally equivalent to the first signal source not being connected to the first input pin 222 at all. Practically, as long as the first signal 204 is near zero, the first signal 204 will not produce significant noise on the other pins. In some embodiments, the memory device 220 contains instructions that cause the processor 218 to sample the second signal 208 at the second input pin 224 only when an absolute value of the magnitude of the first signal 204 at the first input pin 222 is less than a threshold value. The threshold value may be any suitable value, such as 500 millivolts, one volt, two volts, the power supply voltage (VDD) of the controller 201, or the like. In some embodiments, the processor 218 samples the second signal 208 at the second input pin 224 only when the value of the first signal 204 is between ground and VDD, between 0.1 volts below VDD and 0.1 volts above ground, between 0.5 volts below VDD and 0.5 volts above ground, or between any other suitable voltages.

Because the first signal 204 is an AC signal, the first signal will cross zero twice per cycle. The frequency of the zero crossings is determined by the frequency of the AC signal. In the US, the frequency of the AC signal will be about 60 Hz and the frequency of the zero crossings will be about 120 Hz.

In some embodiments, the memory device 220 stores instructions that when executed by the processor 218 cause the processor 218 to sample the third signal 212 at the third input pin 226 only when the first signal 204 has a value of about zero volts at the first input pin 222. In other embodiments, memory device 220 stores instructions that when executed by the processor 218 cause the processor 218 to sample the second signal 208 at the second input pin 224 a first time the first signal 204 has a value of about zero volts at the first input pin 222 and sample the third signal 212 at the third input pin 226 at a later, second time the first signal 204 has a value of about zero volts at the first input pin 222. In still other embodiments, the memory device 220 stores instructions that when executed by the processor 218 cause the processor 218 to sample the second signal 208 at the second input pin 224 and the third signal 212 at the third input pin 226 during a same time the first signal 204 has a value of about zero volts at the first input pin 222. Similarly, in embodiments, that sample the inputs when the voltage is less than a threshold value, the third signal 212 through the Nth signal 214 may be sampled at the same time as the second signal 204 or sequentially sampled during successive periods during which the absolute value of the magnitude of the first signal 204 is less than the threshold value.

The controller 201 may include and/or be embodied in a computing device. The computing device may include, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by a processor, cause the processor to perform at least a portion of the methods described herein. The memory device can include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage.

The controller 201 may include one or more communication interfaces allowing the controller 201 to communicate with remote devices and systems, such as sensors, valve control systems, safety systems, remote computing devices, and the like. The communication interfaces may be wired or wireless communications interfaces that permit the computing device to communicate with the remote devices and systems directly or via a network. Wireless communication interfaces may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Wash.; ZigBee is a registered trademark of the ZigBee Alliance of San Ramon, Calif.) Wired communication interfaces may use any suitable wired communication protocol for direct communication including, without limitation, USB, RS232, I2C, SPI, analog, and proprietary I/O protocols. Moreover, in some embodiments, the wired communication interfaces include a wired network adapter allowing the computing device to be coupled to a network, such as the Internet, a local area network (LAN), a wide area network (WAN), a mesh network, and/or any other network to communicate with remote devices and systems via the network.

Figure 3:
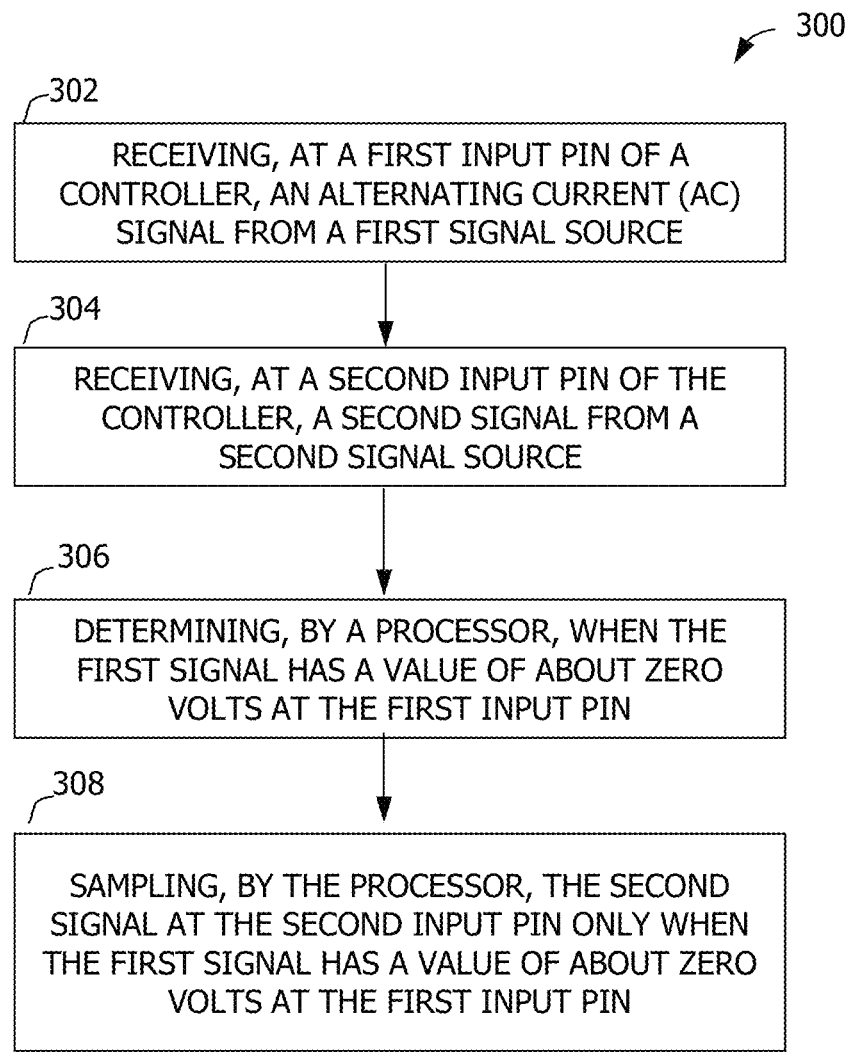
FIG. 3 is a flow diagram for controlling the system shown in FIG. 2.

FIG. 3 is a flow diagram illustrating an example method 300 for controlling the system shown in FIG. 2. In this embodiment, a controller includes a processor, a first input pin which is coupled to an analog to digital (A/D) converter, and a second input pin. An alternating current (AC) signal is received 302 at a first input pin of the controller from a first signal source. A second signal is received 304 at a second input pin of the controller from a second signal source. The processor determines 306 when the first signal received at the first input pin has a value of about zero volts. The processor then samples 308 the second signal received at the second input pin only when the first signal has a value of about zero volts at the first input pin.

In some embodiments, the method 300 further includes receiving, at a third input pin of the controller, a third signal from a third signal source, and sampling, by the processor, the third signal at the third input pin only when the first signal has a value of about zero volts at the first input pin. In other embodiments, the method 300 includes sampling, by the processor, the second signal at the second input pin a first time the first signal has a value of about zero volts at the first input pin and sampling the third signal at the third input pin at a later, second time the first signal has a value of about zero volts at the first input pin. In still other embodiments, the method 300 includes sampling, by the processor, the second signal at the second input pin and the third signal at the third input pin during a same time the first signal has a value of about zero volts at the first input pin. Depending on the embodiment, for example, the processor may sample input pins individually or the processor may sample any combination of input pins simultaneously at a given time when the first signal has a value of about zero volts at the first input pin. Other embodiments are contemplated in which a single input pin is coupled to more than one signal source, such that signals from each of multiple different signal sources are received at the same input pin of the controller. Alternatively or additionally, some embodiments may include a signal source coupled to more than one input pin such that multiple pins receive a signal from the same signal source.

Figure 4:
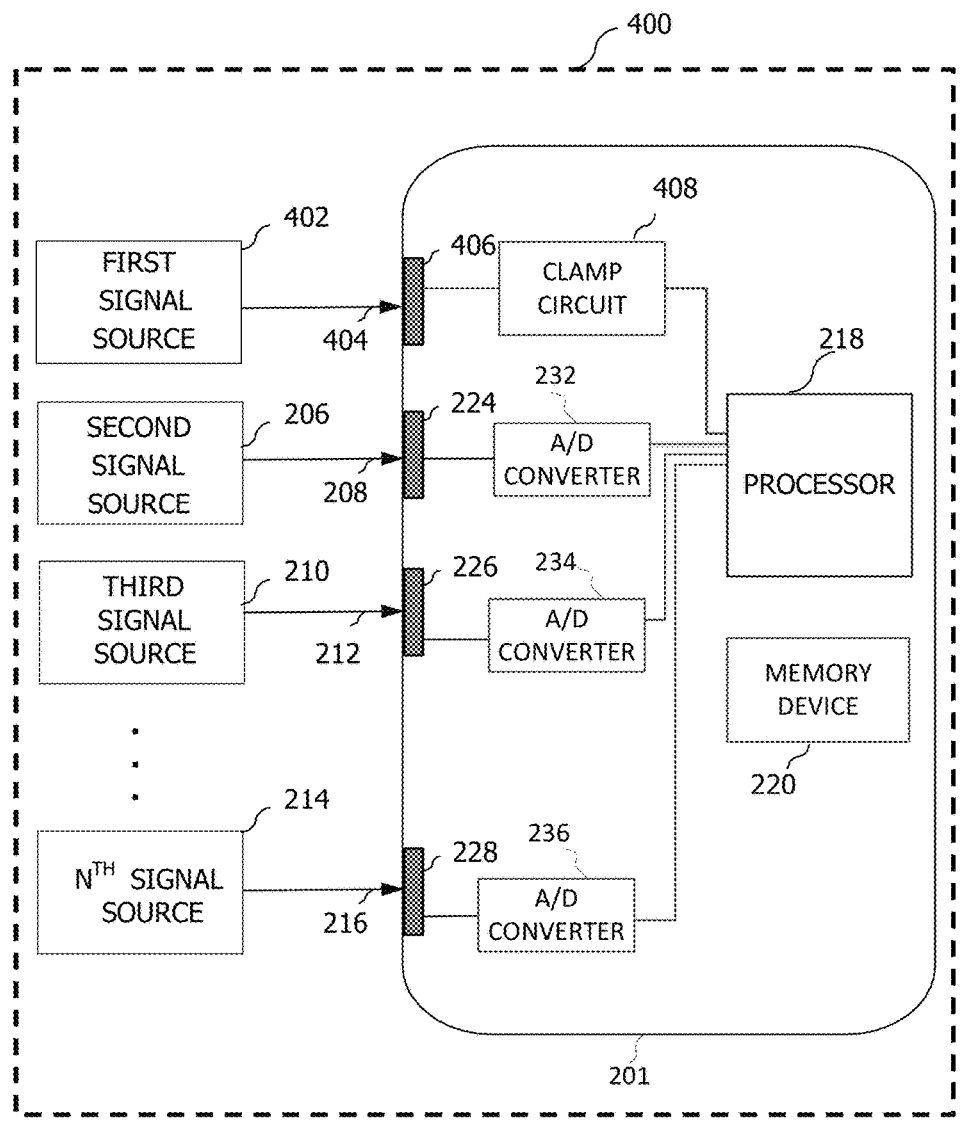
FIG. 4 is a block diagram of a portion of a control system for use in the appliance control system shown in FIG. 1.

FIG. 4 is a block diagram of a portion of another control system 400 for use in the appliance control system 100 shown in FIG. 1. The control system 400 may be part of the controller 114, the thermostat 112, or any other controller used in appliance control system 100. Except as described herein, the control system 400 is the same as the control system 200 and the same reference numbers are used to indicate like components.

The control system 400 includes a first signal source 402 that produces an alternating current (AC) signal 404. In the example embodiment, the first signal source 402 is an AC voltage source that provides AC power to other AC components of the system 100. In other embodiments, signal source 402 may include sensors, probes, detectors, switches, dip switches, or any other suitable signal source. The first signal source 402 is configured to produce AC signal 404 with a voltage of about twenty-four volts. Other embodiments are also contemplated in which the first signal source 402 is configured to produce AC signal 404 with a different voltage. One or more of the third signal 212 to the Nth signal 216 is also an AC signal substantially in phase with the AC signal 404.

The first signal source 402 is coupled to a first input pin 406 of the controller 201. The first input pin 406 is a digital input pin without an A/D converter. A clamp circuit 408 converts the AC signal 404 to a square wave that is provided to the processor 218.

To limit the noise when the non-AC signals are sampled, the memory device 220 stores instructions that when executed by the processor 218 cause the processor 218 to sample the second signal 208 at the second input pin 224 only when the first signal 404 has a value of about zero volts at the first input pin 406 (i.e., at a zero crossing). Processor 218 identifies the zero crossing based on identification of the edges of the square wave produced by the clamp circuit 408. In some embodiments, the memory device 220 contains instructions that cause the processor 218 to sample the second signal 208 at the second input pin 224 slightly before the expected zero crossing to compensate for the time needed for A/D conversion and sampling.

In some embodiments, the memory device 220 stores instructions that when executed by the processor 218 cause the processor 218 to sample the third signal 212 at the third input pin 226 only when the first signal 304 has a value of about zero volts at the first input pin 306. In other embodiments, memory device 220 stores instructions that when executed by the processor 218 cause the processor 218 to sample the second signal 208 at the second input pin 224 a first time the first signal 304 has a value of about zero volts at the first input pin 306 and sample the third signal 212 at the third input pin 226 at a later, second time the first signal 304 has a value of about zero volts at the first input pin 306. In still other embodiments, the memory device 220 stores instructions that when executed by the processor 218 cause the processor 218 to sample the second signal 208 at the second input pin 224 and the third signal 212 at the third input pin 226 during a same time the first signal 304 has a value of about zero volts at the first input pin 306.

In a particular embodiment, the appliance being controlled in the control system 100 is a furnace. Open and closed positions of four switches of a four position DIP switch are read with one input. The switches are coupled to different resistances and the combinations of open and closed switches produce different analog values to provide to the controller. These switches are used to make selection in parameters of operation of the furnace, values for Heat on and/or off delays, cool on and/or off delays, staging options, etc.

Although described herein with reference to an HVAC system and a gas-fired furnace, it should be understood the methods and systems described herein are suitable for use in any suitable systems including a controller with relatively large (with respect to VDD) signal sources coupled input pins with A/D controller. Additionally, the methods and systems herein are also suited for use with other appliance including, for example, gas powered boilers, pool heaters, water heaters, clothes dryers, clothes washers, refrigerators, ovens, thermostats, and the like, and particularly those appliances configured for use with 24VAC signal sources. Moreover, although described with respect to a particular configuration, the systems and methods described herein can be used with systems with different configurations. For example, some appliances may use signal sources having other voltage values and/or current types. For example, some systems utilize 120VAC or 240VAC. The system and methods described herein can be used in such systems to provide accurate voltage readings at input pins of the controller. Moreover, some embodiments additionally or alternatively include the use of additional elements, such as filters, circuitry to limit how far above the VDD or how far below the ground voltage a pin voltage is read, or the like to limit noise on the input pins.

Embodiments of the methods and systems described herein achieve superior results compared to prior methods and systems. The example control system more accurately reads signal voltage values at selected input pins by sampling only when the first signal has a value of about zero volts at the first input pin, and previously skewed signal readings are reduced or altogether eliminated. These more accurate signal samplings are achieved by the systems and methods described herein, thus allowing for use of more cost effective microcontroller units.

Example embodiments of systems and methods for controlling appliances are described above in detail. The system is not limited to the specific embodiments described herein, but rather, components of the system may be used independently and separately from other components described herein. For example, the controller and processor described herein may also be used in combination with other systems and methods, and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A control system for controlling operation of an appliance, the control system comprising:
   a first signal source, the first signal source configured to produce an alternating current (AC) signal;
   a second signal source, the second signal source configured to produce a second signal; and
   a controller, the controller comprising:
      a processor;
      a memory device;
      a first input pin coupled to the first signal source to receive the AC signal;
      a second input pin coupled to the second signal source to receive the second signal; and
      a first analog to digital (A/D) converter coupled to the first input pin, the memory device storing instructions that when executed by the processor cause the processor to sample the second signal at the second input pin only when the first signal has a value of about zero volts at the first input pin.

2. The control system of claim 1, wherein the first signal source comprises a sensor.

3. The control system of claim 2, wherein the sensor comprises at least one dip switch.

4. The control system of claim 1, wherein the first signal source is configured to produce the AC signal with a voltage of about twenty-four volts.

5. The control system of claim 1 further comprising a second A/D converter coupled to the second pin.

6. The control system of claim 1, wherein the controller is configured to be powered by a voltage at a first magnitude and the first signal source is configured to produce the AC signal with a voltage at a second magnitude greater than the first magnitude.

7. The control system of claim 6, wherein the second magnitude is at least twice the first magnitude.

8. The control system of claim 1 further comprising a third signal source configured to produce a third signal, the controller further comprising a third input pin coupled to the third signal source to receive the third signal, the memory device storing instructions that when executed by the processor cause the processor to sample the third signal at the third input pin only when the first signal has a value of about zero volts at the first input pin.

9. The control system of claim 8, wherein the memory device stores instructions that when executed by the processor cause the processor to sample the second signal at the second input pin a first time the first signal has a value of about zero volts at the first input pin and sample the third signal at the third input pin at a later, second time the first signal has a value of about zero volts at the first input pin.

10. The control system of claim 8, wherein the memory device stores instructions that when executed by the processor cause the processor to sample the second signal at the second input pin and the third signal at the third input pin during a same time the first signal has a value of about zero volts at the first input pin.

11. A method of controlling operation of an appliance with a controller including a processor, a first input pin, and a second input pin, the first input pin coupled to an analog to digital (A/D) converter, the method comprising:
   receiving, at the first input pin of the controller, an alternating current (AC) signal from a first signal source;
   receiving, at the second input pin of the controller, a second signal from a second signal source;
   determining, by the processor, when the first signal has a value of about zero volts at the first input pin; and
   sampling, by the processor, the second signal at the second input pin only when the first signal has a value of about zero volts at the first input pin.

12. The method of claim 11, wherein receiving an AC signal from a first signal source comprises receiving an AC signal from a sensor.

13. The method of claim 12, wherein receiving an AC signal from a sensor comprises receiving an AC signal from at least one dip switch.

14. The method of claim 11, wherein receiving an AC signal from a first signal source comprises receiving an AC signal from a first signal source configured to produce the AC signal with a voltage of about twenty-four volts.

15. The method of claim 11, wherein receiving at the second input pin of the controller comprises receiving, at the second input pin coupled to an A/D converter.

16. The method of claim 11, wherein receiving an AC signal from a first signal source comprises receiving an AC signal with a voltage at a second magnitude greater than a first magnitude of a voltage by which the controller is configured to be powered.

17. The method of claim 16, wherein receiving an AC signal with a voltage at a second magnitude greater than a first magnitude comprises receiving a voltage with a second magnitude that is at least twice the first magnitude.

18. The method of claim 11 further comprising receiving, at a third input pin of the controller, a third signal from a third signal source, and sampling, by the processor, the third signal at the third input pin only when the first signal has a value of about zero volts at the first input pin.

19. The method of claim 18, further comprising sampling, by the processor, the second signal at the second input pin a first time the first signal has a value of about zero volts at the first input pin and sampling the third signal at the third input pin at a later, second time the first signal has a value of about zero volts at the first input pin.

20. The method of claim 18, further comprising sampling, by the processor, the second signal at the second input pin and the third signal at the third input pin during a same time the first signal has a value of about zero volts at the first input pin.

21. A control system for controlling operation of an appliance, the control system comprising:
    a first signal source, the first signal source configured to produce an alternating current (AC) signal;
    a second signal source, the second signal source configured to produce a second signal; and
    a controller, the controller comprising:
        a processor;
        a memory device;
        a first input pin coupled to the first signal source to receive the AC signal;
        a second input pin coupled to the second signal source to receive the second signal; and
        a clamp circuit coupled to the first input pin to receive the AC signal and output a square wave to the processor, the memory device storing instructions that when executed by the processor cause the processor to sample the second signal at the second input pin only when the first signal has a value of about zero volts at the first input pin.

22. The control system of claim 21, wherein the first signal source is configured to produce the AC signal with a voltage of about twenty-four volts.

23. The control system of claim 21 further comprising an A/D converter coupled to the second pin.

24. The control system of claim 21, wherein the controller is configured to be powered by a voltage at a first magnitude and the first signal source is configured to produce the AC signal with a voltage at a second magnitude greater than the first magnitude.

25. The control system of claim 24, wherein the second magnitude is at least twice the first magnitude.

26. The control system of claim 21 further comprising a third signal source configured to produce a third signal, the controller further comprising a third input pin coupled to the third signal source to receive the third signal, the memory device storing instructions that when executed by the processor cause the processor to sample the third signal at the third input pin only when the first signal has a value of about zero volts at the first input pin.

27. The control system of claim 26, wherein the memory device stores instructions that when executed by the processor cause the processor to sample the second signal at the second input pin a first time the first signal has a value of about zero volts at the first input pin and sample the third signal at the third input pin at a later, second time the first signal has a value of about zero volts at the first input pin.

28. The control system of claim 26, wherein the memory device stores instructions that when executed by the processor cause the processor to sample the second signal at the second input pin and the third signal at the third input pin during a same time the first signal has a value of about zero volts at the first input pin.

29. The control system of claim 21, wherein memory device stores instructions that when executed by the processor cause the processor to determine when the first signal has a value of about zero volts at the first input pin by identifying at least one edge of the square wave output by the clamp circuit.

* * * * *